(12) United States Patent
Cockerham (10) Patent No.: US 6,168,106 B1
(45) Date of Patent: Jan. 2, 2001

(54) REMOTELY OPERABLE CENTRIFUGAL BRAKE

(75) Inventor: Rayford Alan Cockerham, Broken Arrow, OK (US)

(73) Assignee: Brunswick Corporation, Tulsa, OK (US)

(*) Notice: Under 35 U.S.C. 154(b), the term of this patent shall be extended for 0 days.

(21) Appl. No.: 09/143,488

(22) Filed: Aug. 28, 1998

(51) Int. Cl.[7] .................................................. A01K 89/02
(52) U.S. Cl. ........................................ 242/289; 188/185
(58) Field of Search .................................. 242/243, 245, 242/246, 289; 188/185, 180, 184

(56) References Cited

U.S. PATENT DOCUMENTS

| | | |
|---|---|---|
| 4,917,321 | 4/1990 | Roberts . |
| 5,356,090 | 10/1994 | Sato . |
| 5,362,011 * | 11/1994 | Sato ...................................... 242/289 |
| 5,372,324 | 12/1994 | Sato . |
| 5,393,005 * | 2/1995 | Nakajima ............................ 242/289 |
| 5,542,619 * | 8/1996 | Karlsson ............................. 242/289 |
| 5,782,420 | 7/1998 | Forslund et al. . |
| 5,803,385 * | 9/1998 | Baisch ................................. 242/289 |
| 5,865,387 * | 2/1999 | Hirano ................................ 242/289 |
| 5,950,949 * | 9/1999 | Cockerham ......................... 242/289 |
| 5,984,221 * | 11/1999 | Kim .................................... 242/289 |
| 5,996,921 * | 12/1999 | Hogaki et al. ...................... 242/289 |
| 6,003,798 * | 12/1999 | Kim .................................... 242/289 |

FOREIGN PATENT DOCUMENTS 2257882   1/1993   (GB) .

* cited by examiner

Primary Examiner—Donald P. Walsh
Assistant Examiner—Emmanuel M. Marcelo
(74) Attorney, Agent, or Firm—Wood, Phillips, VanSanten, Clark & Mortimer (57) ABSTRACT

A fishing reel has a frame and an operating mechanism on the frame. The operating mechanism includes a spool assembly mounted to the frame for rotation around a first axis to direct fishing line onto the spool assembly. The operating mechanism also includes a brake assembly. The brake assembly includes a brake surface on the frame, a brake weight with a brake weight surface, and a first mechanism for mounting the brake weight to the spool assembly for movement between a) a first position wherein the brake weight surface on the brake weight is urged against the brake surface on the frame to generate a first braking force as an incident of the spool assembly rotating at a first predetermined velocity and b) a second position wherein the brake weight surface on the brake weight is not urged against the brake surface on the frame to generate a braking force as large as the first braking force. Additionally, the brake assembly further includes a selector that is operable remotely from the brake weight placeable selectively in a first and a second state for i) preventing the brake weight from moving from the second position into the first position as the spool assembly is rotated at the first predetermined velocity with the selector in the first state and ii) allowing the brake weight to move from the second position into the first position as the spool assembly is rotated at the first predetermined velocity with the selector in the second state.

19 Claims, 9 Drawing Sheets

REMOTELY OPERABLE CENTRIFUGAL BRAKE

FIELD OF THE INVENTION

The present invention is directed to a centrifugal brake for a fishing reel. In particular, the present invention is directed to a centrifugal brake having an adjustable braking force.

BACKGROUND OF THE INVENTION

Centrifugal brakes are commonly used to prevent backlash in bait casting reels. These bait casting reels conventionally have a frame including a reel cover surrounding and enclosing an operating mechanism. As part of the operating mechanism, the centrifugal brake will include one or more brake weights, each mounted to a line-carrying spool assembly for rotation with the spool assembly about a central axis and for movement radially relative to the central axis as an incident of centrifugal forces produced by rotation of the spool assembly being developed thereon. Each of the brake weights has a brake weight surface at a distal radial end of the brake weight. During operation of the brake system, the brake weights rotate with the spool assembly and translate freely radially until the brake weight surface contacts a brake surface on the reel frame, whereupon the friction force generated between the brake weight surface and the brake surface slows the rotation of the spool.

Commonly, the brake weights are not restricted in their radially movement until the brake pad contacts the brake surface. See, for example, U.S. Pat. No. 4,917,321 to Roberts. Consequently, when the centrifugal force is great enough, all of the weights will contact the brake surface. The result is that only a single level of braking force is achievable.

However, it may be desirable to be able to vary the braking force such that different levels of braking force are achievable. For example, it may be desirable to be able to vary the level of braking force to compensate for difference in line weight.

One system and method used to provide variable braking force includes providing brake weights of various masses which are selectively attachable to and removable from the spool assembly. Accordingly, to decrease the braking force, the weights originally attached to the spool are replaced with weights of a lower total mass. By contrast, to increase the braking force, the original weights are replaced with weights having a higher total mass.

This system and method for providing variable braking force has several significant drawbacks. First, the selection of the proper sized weight to generate the proper braking force may be a relatively complicated process, and not easily performed by the novice angler. Second, once the weights have been detached from the spool, it is very easy for the weights to become misplaced or lost because of their small size. Third, at least a portion of the reel body and at least a portion of the operating mechanism of the reel may need to be removed, which step may also not be easily performed by the novice angler, or even the experience angler if performed in the field. Fourth, the removal of the reel body exposes the operating mechanism of the reel to contamination, for example from water and dirt. These contaminants can cause the performance of the reel to be degraded over time, leading to a shorter reel life.

An alternative system and method for providing variable braking force has been suggested wherein the brake weights remain attached to the spool at all times, but the radial motion of the brake weights is selectively restricted to vary the braking force. See, for example, U.S. Pat. Nos. 5,356,090 and 5,372,324 to Sato and U.K. Patent No. 2,257,882 to Nakajima. According to this method, one or more brake weights are disposed on a radial arm for unrestricted radial movement along the arm in a first braking state. In a second braking state, the radial movement of one or more of the weights is restricted by a radial stop which is fixed at a specific radial distance relative to the spool. In the second braking state, the number of weights which have their movement restricted by the stop can be varied such that the braking force generated thereby is varied.

This system also has significant drawbacks. Again, the function of the system may not be easily understood by the novice angler. Additionally, at least a portion of the reel body must still be disassembled to provide access to the weights for manual manipulation of the weights using the fingertips. Given the small size of the reel, and the limited access to the weights that most of these systems provide, changing the braking force may still be a tedious, labor-intensive activity. The removal of at least a portion of the reel body also allows contaminants to migrate into the operating mechanism.

SUMMARY OF THE INVENTION

In an aspect of the present invention, there is provided a fishing reel with a frame and an operating mechanism on the frame. The operating mechanism includes a spool assembly mounted to the frame for rotation around a first axis to direct fishing line onto the spool assembly. The operating mechanism also includes a brake assembly. The brake assembly includes a brake surface on the frame, a brake weight with a brake weight surface, and a first mechanism for mounting the brake weight to the spool assembly for movement between a) a first position wherein the brake weight surface on the brake weight is urged against the brake surface on the frame to generate a first braking force as an incident of the spool assembly rotating at a first predetermined velocity and b) a second position wherein the brake weight surface on the brake weight is not urged against the brake surface on the frame to generate a braking force as large as the first braking force. Additionally, the brake assembly further includes a selector that is operable remotely from the brake weight and placeable selectively in a first and a second state for i) preventing the brake weight from moving from the second position into the first position as the spool assembly is rotated at the first predetermined velocity with the selector in the first state and ii) allowing the brake weight to move from the second position into the first position as the spool assembly is rotated at the first predetermined velocity with the selector in the second state.

Therefore, the present invention may provide a system for varying the braking force of a centrifugal brake which is easily understood by the novice angler.

The present invention may also provide a system for varying the braking force of a centrifugal brake which is easily performed by the novice angler.

The present invention may provide a system for varying the braking force of a centrifugal brake which does not require disassembly of the reel body.

The present invention may provide a system for varying the braking force of a centrifugal brake which limits the unrestricted passage of contaminants to the operating mechanism of the reel.

DESCRIPTION OF THE PREFERRED EMBODIMENT

Figure 1:
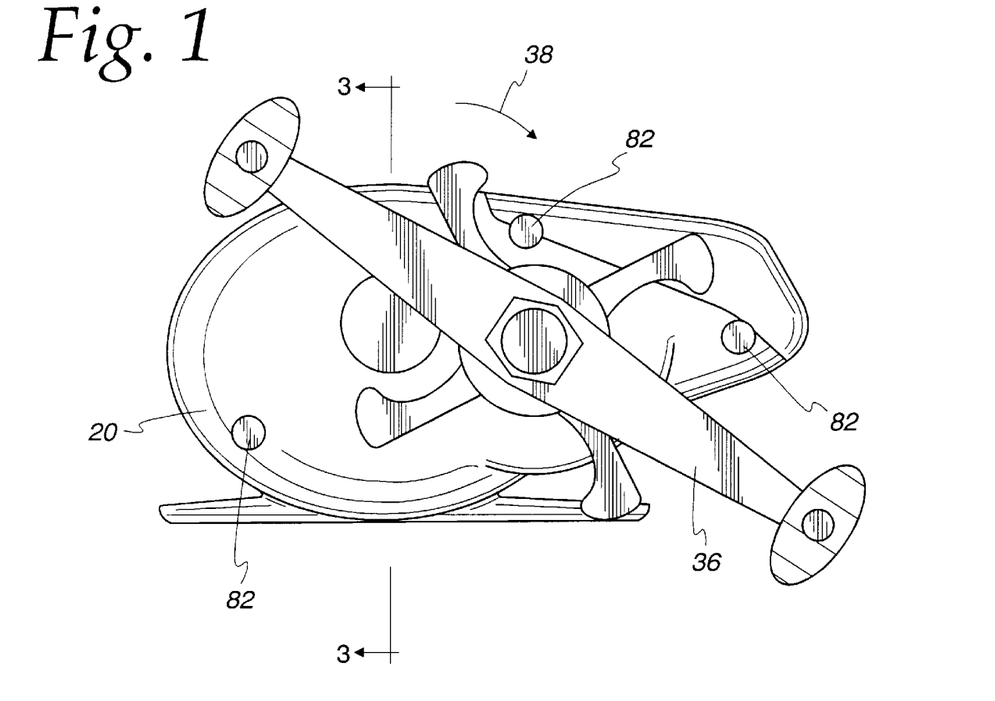
FIG. 1 is a side elevation view of a bait cast fishing reel with a centrifugal braking system according to the present invention incorporated therein.
Figure 2:
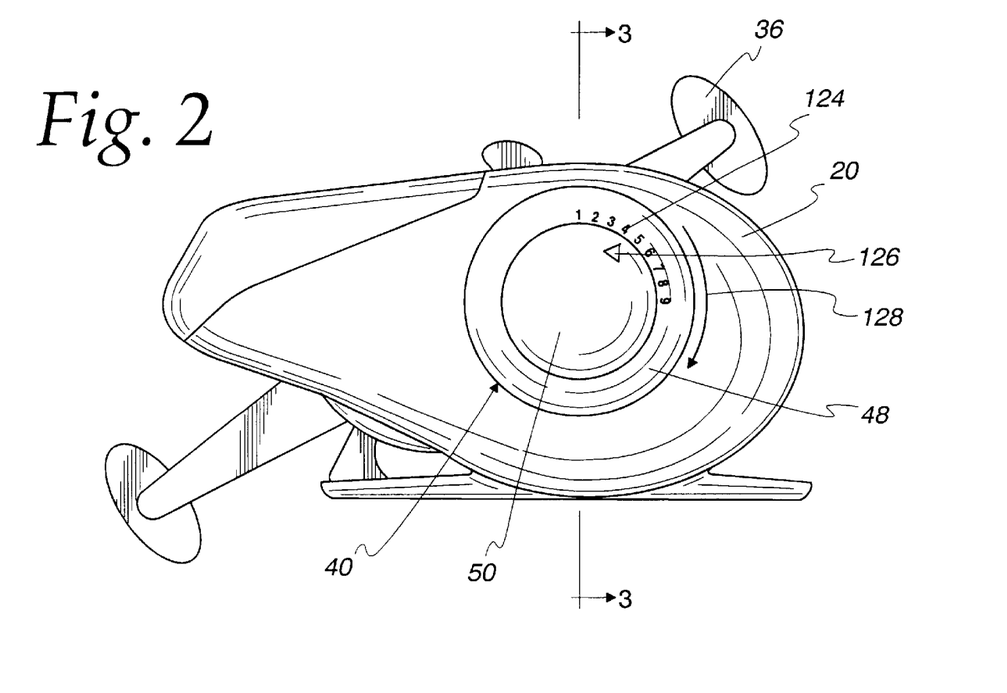
FIG. 2 is a side elevation view of the bait cast fishing reel of FIG. 1 taken from the side opposite to that of FIG. 1.
Figure 3:
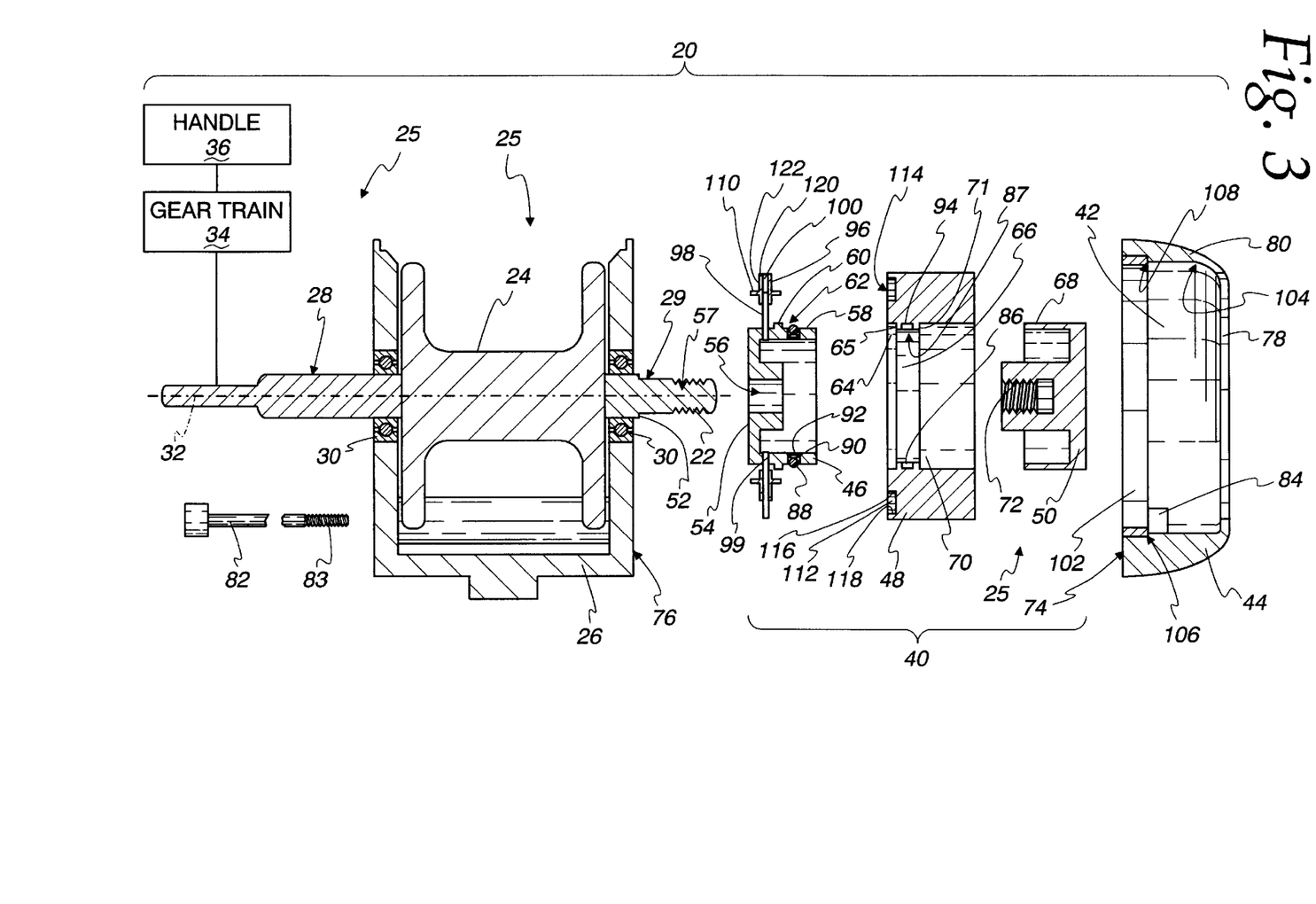
FIG. 3 is an enlarged, exploded cross-sectional view of the fishing reel shown in FIGS. 1 and 2 taken about line 3—3 in FIGS. 1 and 2 showing the inventive braking system including brake weights, a brake weight carrier, a brake force selection mechanism and a brake cover.
Figures 4A, 4C, 4E:
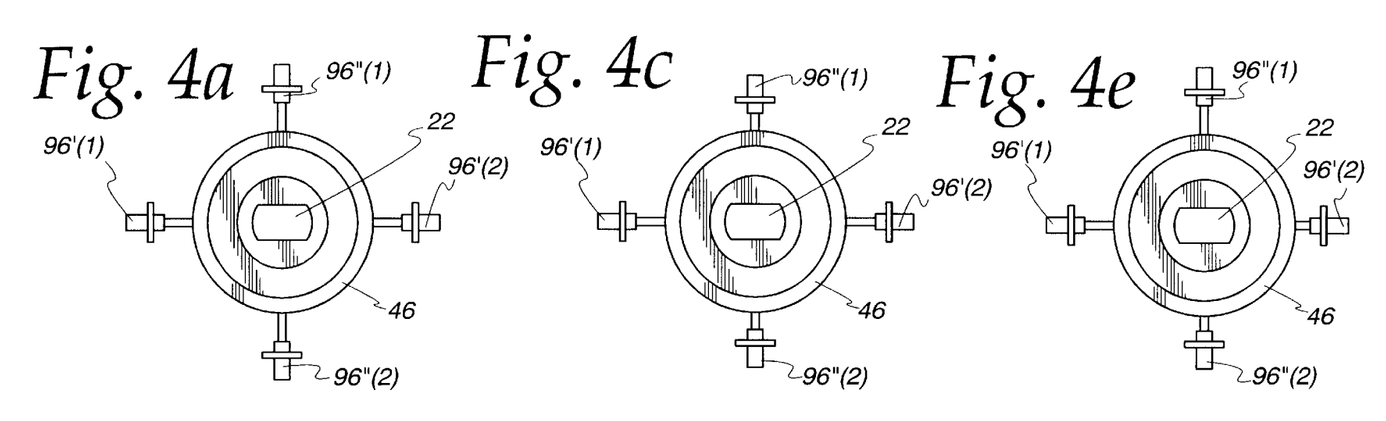
FIGS. 4a–i are enlarged, partial side elevation views of the inventive brake system with the brake force selection mechanism and brake cover removed to show the various arrangements of brake weights achievable with the fishing reel in FIGS. 1–3.
Figures 4B, 4D:
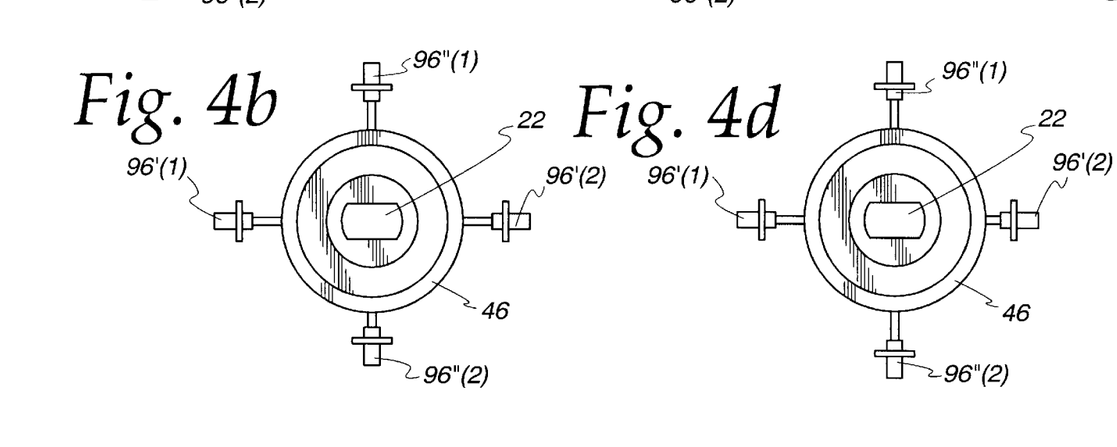
Figure 4F:
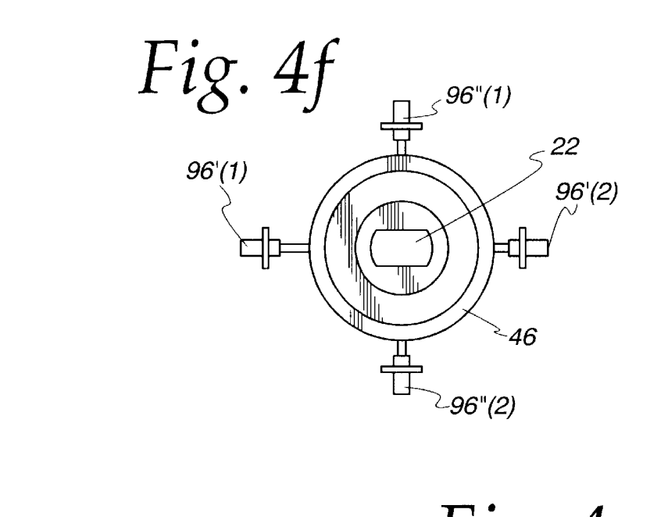
Figure 4G:
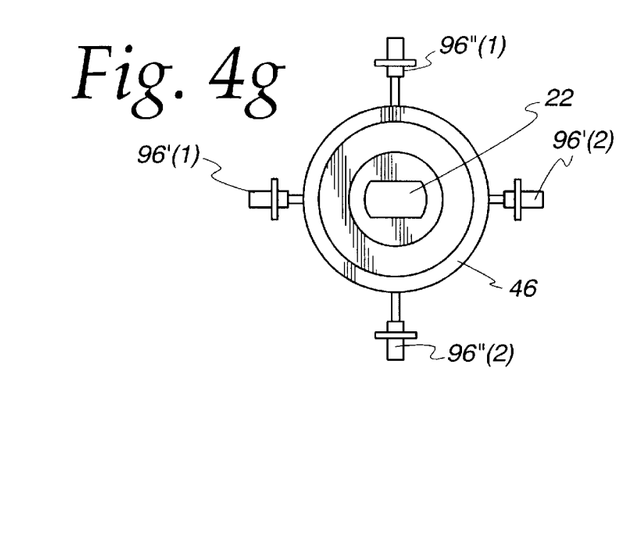
Figure 4H:
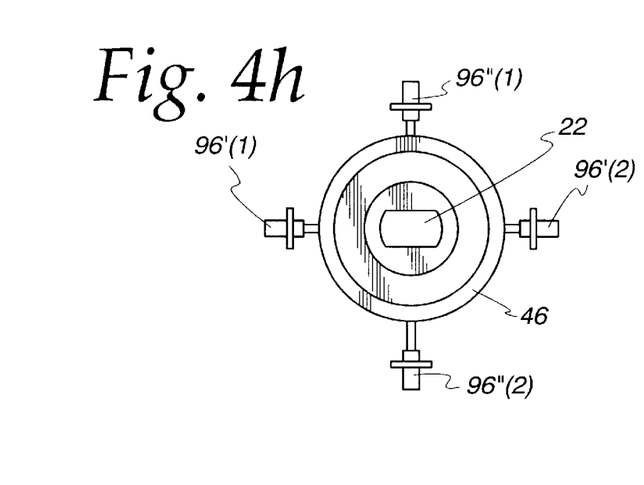
Figure 4I:
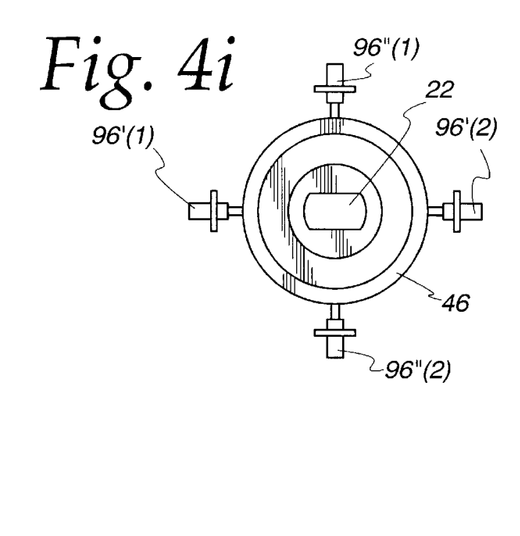

FIGS. 1–5 show a first embodiment of the present invention for a remotely operable centrifugal brake, incorporated into a bait casting fishing reel, is indicated as 20. As shown in FIGS. 1–3, the fishing reel 20 includes a shaft 22 to which is fixedly mounted a line-carrying spool 24. The shaft 22 is part of a reel operating mechanism 25 that is mounted to a reel frame 26. The ends 28, 29 of the shaft 22 are supported on the frame 26 through bearings 30 so that the shaft 22 and the spool 24, preferably having a common axis of symmetry 32, are rotatable about the axis 32.

The end 28 of the shaft 22 is driveably engaged by a gear train 34 on the operating mechanism 25, which in turn is attached to a handle 36, shown in FIGS. 1–3. The gear train 34 engages the end 28 of the shaft 22 such that in a first, retrieve state an angular displacement of the handle 36 in the clockwise direction 38 (shown in FIG. 1) causes the shaft 22 and the spool 24 to rotate counter-clockwise (with reference to FIG. 1) about the axis 32. The operating mechanism 25 may include a conventional anti-reverse mechanism (not shown) which prevents the handle 36 from being displaced in a counter-clockwise direction in the retrieve state. The operating mechanism 25 also includes a conventional mechanism (not shown) for disengaging the gear train 34 from the shaft 22 in a second, casting state to allow the shaft 22 and the spool 24 to rotate about the axis 32 unrestricted by the action of the gear train 34.

The end 29 of the shaft 22 is attached to a centrifugal brake system 40 of the present invention, that is also part of the operating mechanism 25. The centrifugal brake system 40 is used to control rotation of the spool 24 about the axis 32 with the reel in the casting state. The brake system 40 sits in a receptacle 42 defined by the frame 26, which includes a reel casing or reel cover 44. The brake system 40 has three major parts: a brake-weight carrier 46, a brake force selection mechanism or selector 48, and a brake cover 50.

The axially distal portion of the end 29 of the preferably substantially cylindrical shaft 22 is stepped to define an annular shoulder 52 which cooperates with a facing shoulder 54 formed about a bore 56 through the brake weight carrier 46 so as to seat the brake weight carrier 46 at a specific distance along the shaft 22 from the reel frame 26. The shaft end 29 is keyed to the weight carrier 46 by providing flats 57 on the surface thereof and a complementary shape for the bore 56. Thus disposed on the shaft 22, the brake weight carrier 46 is caused to rotate about the axis 32 at a predetermined axial location.

The brake weight carrier 46 is of generally cylindrical shape and annular cross-section, and has an external surface 58 on which is formed a flange 60. The flange 60 defines an outwardly axially facing shoulder 62 which fits within a first groove 64 formed about the perimeter of a bore 66 formed in the selector 48 and abuts to a surface 65 at the base of the groove 64 so as to position the selector 48 axially relative to the brake weight carrier 46 and the shaft 22 in an operative position.

The axial operative position of the selector 48 is maintained within allowable tolerances by disposing the brake cover 50 along the shaft 22 such that an inwardly axially depending flange 68 of the brake cover 50 cooperates with a second groove 70 formed about the perimeter of the bore 66 and abuts to a shoulder 71 at the base thereof. Radially inward from the flange 68 is formed a preferably threaded socket 72 which protrudes through the bore 66 formed in the selector 48 with the flange 68 abutted to the surface 71. The socket 72 can be used to releasably secure the brake cover 50 to an axially distal, preferably threaded portion of the end 29.

As seen in FIGS. 2 and 3, with the brake system 40 thus assembled, the reel cover 44 is attached to the frame 26 of the reel 20 with a base edge 74 of the reel cover 44 abutting an axially outwardly facing surface 76 of the frame 26. The selector 48 and brake cover 50 extend axially outward through an opening 78 formed in a wall 80 of the reel cover 44. The reel cover 44 is preferably secured to the frame 26 by passing one or more (preferably three) threaded pins 82 through passages (not shown) formed in the frame 26 and the reel cover 44, and securing the threaded ends 83 of the pins 82 in threaded sockets 84 (one of which is shown in FIG. 3) formed in the reel cover 44.

While limited in movement axially along the shaft 22 by the flanges 60, 68, the selector 48, unlike the brake weight carrier 46 and brake cover 50, is not substantially fixedly secured in its angular position relative to the shaft 22. Rather, the selector 48 is selectively rotatable about the axis 32. The angular position of the selector 48 relative to the shaft 22, the spool 24, the brake cover 50 and most particularly the brake weight carrier 46, is maintained by a plurality of detent locking mechanisms 87 carried on the outer surface 58 of the brake weight carrier 46 and the inner surface 86 of the selector 48.

Specifically, a ball 88 is maintained in a radially outwardly biased state relative to the central axis 32 by a spring 90 in a receptacle 92. The ball 88 is biased by the action of the spring 90 into one of a plurality of recesses 94 formed in the selector 48. Until a sufficient torque is applied to the selector 48 to force the balls 88 radially inward into the receptacles 92, the positioning of the balls 88 at least in part in both the receptacles 92 and the recesses 94 will prevent the rotation of the selector 48 relative to the brake weight carrier 46, the brake cover 50 and the shaft 22.

The selector 48 cooperates with the brake weight carrier 46, and more specifically a plurality of brake weights 96 attached to the brake weight carrier 46, to control the brake force of the brake system 40 in the following manner. A plurality of cylindrically-shaped, brake weight arms 98, in this case four in number, are equally spaced around the outer surface 58 and project therethrough to be secured in apertures 99 formed in the brake weight carrier 46. Each brake weight arm 98 preferably supports a single brake weight 96 such that the brake weight 96 is rotatable with the brake weight carrier 46 and the shaft 22, but is also moveable radially relative to the axis 32. Particularly, each brake weight 96 has a cylindrical bore 100 formed therethrough, and the brake weight 96 is disposed on the brake weight arm 98 so that the brake weight arm 98 is disposed at least partially in the bore 100.

The radially outward motion of the brake weight 96 is limited in the radial direction by a brake surface 102 attached to an inner surface 104 of the wall 80 of the reel cover 44. The brake surface 102 is generally cylindrical in shape and annular in cross-section. The brake surface 102 is positioned in the reel cover 44 such that an edge 106 of the brake surface 102 abuts against a shoulder 108 of the reel cover 44. Preferably, the brake surface 102 is secured to the reel cover 44 using an adhesive, for example, although the brake surface 102 could also be formed as one piece with the reel cover 44.

Figure 5:
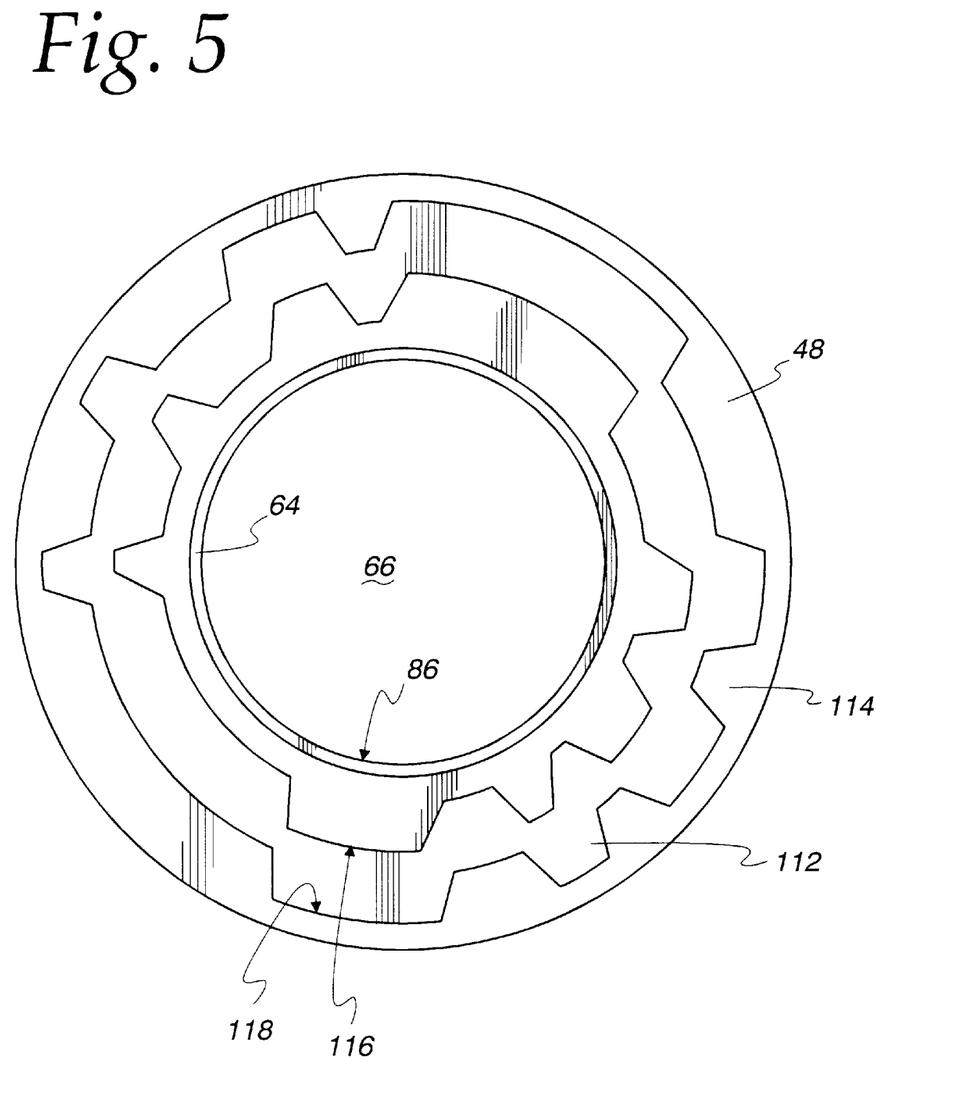
FIG. 5 is an enlarged, partial side elevation view of a brake force selection mechanism for use in the fishing reel in FIGS. 1–3 and showing a race for guiding the brake weights into the different arrangements shown in FIGS. 4a–i.

With the selector 48 disposed in its operative position axially along the shaft 22, the radially outward motion of the brake weight 96 is further limited by the cooperation of a protrusion or flange 110 formed preferably integrally with the brake weight 96 and a race 112 formed in the axially inwardly facing surface 114 of the selector 48. The race 112 has a radially inner wall 116 and a radially outer wall 118. With the brake system 40 assembled and the selector 48 in its axial operative position, the protrusion 110 is disposed within the race 112 so that the protrusion 110 is moveable radially in a limited range between the inner wall 116 and the outer wall 118. With the outer wall 118 positioned substantially radially inward from the brake surface 102, the contact of the brake weight 96, and particularly a brake weight surface 120 formed at a distal end 122 of the brake weight 96, with the brake surface 102 can be prevented or limited.

As can be seen with reference to FIG. 4a–i and FIG. 5, the race 112 is shaped such that each of the brake weights 96 can either contact the brake surface 102, i.e. the brake weight 96 is "on", or each of the brake weights 96 is prevented from contacting the brake surface 102, i.e. the brake weight 96 is "off". Furthermore, preferably, the brake weights 96 are of two different masses (indicated as 96' and 96") and are disposed about the axis 32 such that weights 96 of equal mass are disposed in the same line, while brake weights 96 of different masses are disposed at 90° to each other. Below is a table summarizing the different positions achievable with the first embodiment of the present invention.

| brake force setting | brake weight 96'(1) | brake weight 96'(2) | brake weight 96"(1) | brake weight 96"(2) |
| --- | --- | --- | --- | --- |
| (FIG. 4a) | on | on | on | on |
| 2 (FIG. 4b) | on | on | on | off |
| 3 (FIG. 4c) | on | on | off | off |
| 4 (FIG. 4d) | on | off | on | on |
| 5 (FIG. 4e) | on | off | on | off |
| 6 (FIG. 4f) | on | off | off | off |
| 7 (FIG. 4g) | off | off | on | on |
| 8 (FIG. 4h) | off | off | off | on |
| 9 (FIG. 4i) | off | off | off | off |

To improve the user-friendliness of the brake system 40, the exposed, axially distal ends of the selector 48 and the brake cover 50 protruding from the opening 78 in the reel cover 44 and outside the receptacle 42 are marked with a numeric symbol or plurality of numeric symbols 124 and an indicator arrow symbol 126, respectively. The numeric symbols 124 and the arrow symbol 126 may be embossed or painted on the externally exposed surfaces of the selector 48 and the brake cover 50 to provide a graphical or numerical display to the angler.

In operation, the adjustment of the braking force is performed by an angler in the following manner without directly accessing the brake weights 96, and without removing the reel cover 44 from the frame 26. While limiting rotation of the shaft 22 about the axis 32 by holding the handle 36 substantially angularly fixed relative to the frame 26, the selector 48 is rotated with a sufficient torque to force the balls 88 radially inwardly into the receptacles 92 and slide the surface 86 past the balls 88. With the balls 88 depressed into the receptacles 92 and contained therein by the surface 86, the selector 48 is rotatable relative to the brake weight carrier 46, the brake cover 50 and the shaft 22 until the balls 88 are again aligned with the recesses 94. Once the balls 88 have been realigned with the recesses 94, an additional torque may be applied to the selector 48 if additional rotation of the selector 48 relative to the brake weight carrier 46, brake cover 50 and shaft 22 is desired.

The change in angular position of the selector 48 relative to the brake cover 50 caused by the application of the torque to the selector 48 causes a relative movement between the numeric symbols 124 and the arrow symbol 126. Correspondingly, the inner and outer race walls 116, 118 contact the protrusions 110 of the brake weights 96 to move one or more of the brake weights 96 radially inwardly or outwardly along the brake weight arms 98. For example, the rotation of the selector 48 relative to the brake cover 50, as indicated by the movement of the arrow symbol 126 from the numeric symbol 124 "4" to the numeric symbol 124 "3", corresponds to the movement of three of the brake weights 96 between the "on" and the "off" positions.

Thus, it may be possible to change the number of brake weights 96 which are contactable with the brake surface 102 without directly accessing the brake weights 96, removing the reel housing 50, or manually displacing the individual brake weights 96. Instead, the brake weights 96 are remotely adjusted between "on" and "off" positions in a manner which may be easily understood to the novice and seasoned angler alike. To aid in the simplicity of operation, the numerical symbols 124 alternatively may be replaced by a symbol 124 "BRAKE ON" at a first angular position along the external surface of the selector 48, a symbol 124 "BRAKE OFF" at a second angular position along the external surface of the selector 48 spaced from the first angular position, and an arrow symbol 124 which indicates that increasing brake force is generated by moving the selector 48 clockwise relative to the brake weight carrier 46, brake cover 50 and the shaft 22 as shown in FIG. 2 by the arrow 128.

An alternative embodiment of the brake system 40 is shown in FIGS. 6–11 in a bait casting reel 129. The reel 129 has a rotatable shaft 130 with axial ends 132, 134 mounted through bearings 136 to a frame 138.

Figure 6:
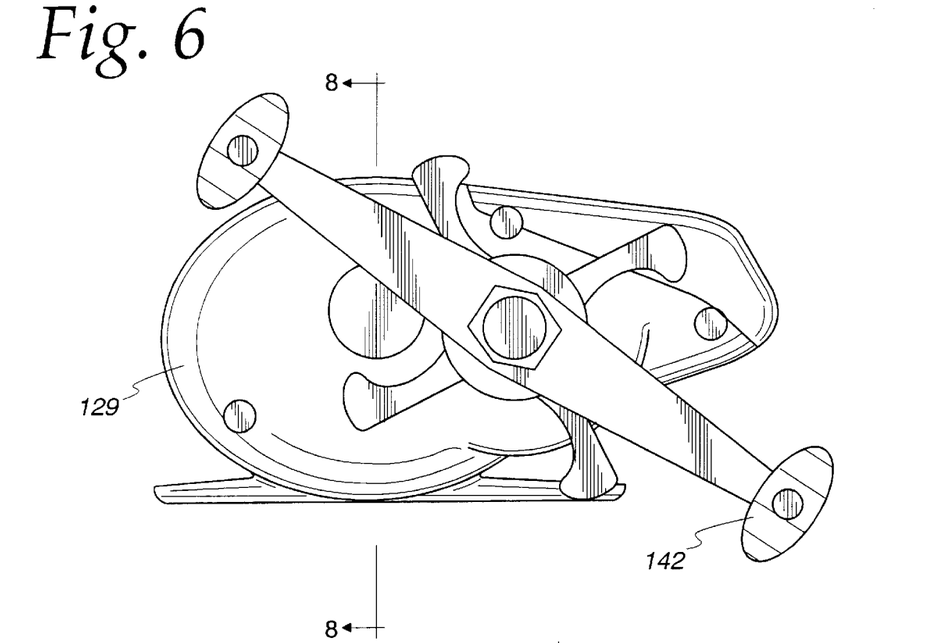
FIG. 6 is a side elevation view of a modified form of bait cast fishing reel with the present invention incorporated therein.
Figure 7:
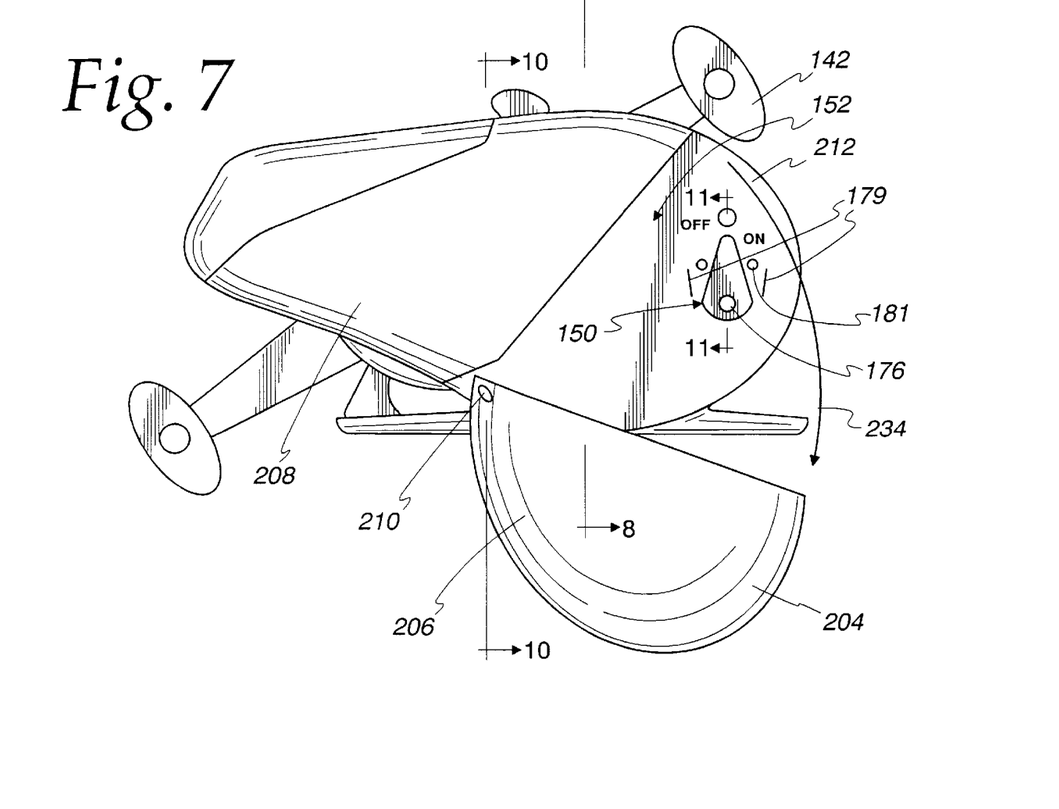
FIG. 7 is a side elevation view of the fishing reel in FIG. 6, taken from the side opposite that in FIG. 6, with a pivotable side cover partially open to expose a brake force selection mechanism.
Figures 8, 8A:
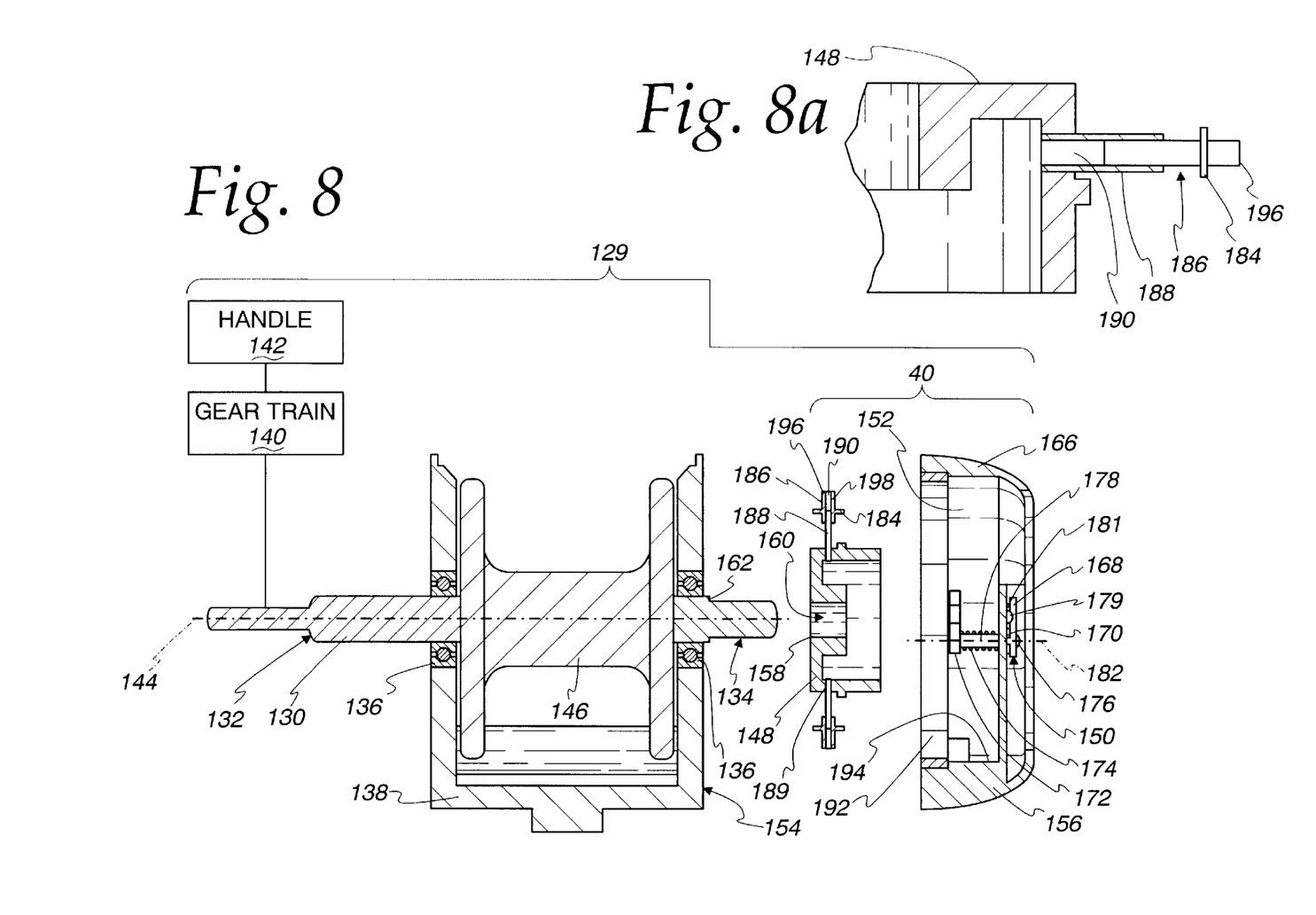
FIG. 8 is an enlarged, exploded cross-sectional view of the fishing reel in FIGS. 6 and 7 taken about line 8—8 in FIGS. 6 and 7 and with the pivotable side cover removed.
FIG. 8a is an enlarged, fragmentary, cross-sectional view of a brake weight mounting with a brake arm having a bore with a brake weight extending partially into the bore.

The end 132 is driveably engaged by a gear train 140, which in turn is attached to a handle 142, shown in FIGS. 6–8. In a retrieve state, movement of the handle 142 from a first angular position to a second angular position causes the shaft 130 to rotate about a central axis 144. A line-carrying spool 146 is secured to the shaft 130 such that rotation of the shaft 130 in the retrieve state causes rotation of the spool 146. As explained above, the operating mechanism for the reel 129 preferably also includes a mechanism (not shown) which disengages the gear train 140 from the shaft 130 in a casting state, so that the spool 146 and shaft 130 may rotate about the axis 144 unrestricted by the gear train 140.

The modified brake system 40 used to limit the speed of rotation of the spool 146 and shaft 130 around the axis 144 is shown in FIGS. 7–9 and 11. The brake system 40 includes a brake weight carrier 148 and a brake force selection mechanism or selector switch 150. The brake weight carrier 148 and at least at portion of the selection switch 150 are disposed in a receptacle 152 defined by the frame 138, including a reel cover 156 thereon.

The brake weight carrier 148 is secured to the shaft 130 so that the carrier 148 is spaced from an outwardly axially facing surface 154 of the frame 138. The secure attachment of the brake weight carrier 148 to the shaft 130 may be made by any means known in the art, but preferably the spacing of the brake weight carrier 148 from the external surface 154 of the frame 138 is maintained by the cooperation of a shoulder 158 around a bore 160 formed in the brake weight carrier 148 and a shoulder 162 formed on the axially distal end 134 of the shaft 130.

The selector switch 150, which can be seen in FIGS. 7–9 and 11, is disposed to pass through an opening 164 in a wall 166 of the reel cover 156 and to project into the receptacle 152. Particularly, the selector switch 150 includes an external switch 168, a washer or spacer 170, a brake weight retractor 172, a biasing mechanism (preferably a spring) 174 and a threaded fastener 176. On an axially outwardly facing side of the wall 166, the fastener 176 is disposed through and secured to the external switch 168 and the spacer 170. On the other side of the reel cover wall 166, the spring 174 is placed around a first, cylindrical, shaft-like portion 178 of the brake weight retractor 172, which shaft portion 178 is then attached to the fastener 176 by threading the fastener 176 into a threaded receptacle 180. The selector switch 150, thus assembled, is capable of rotation about the axis 182 between first and second angular positions.

Figure 11:
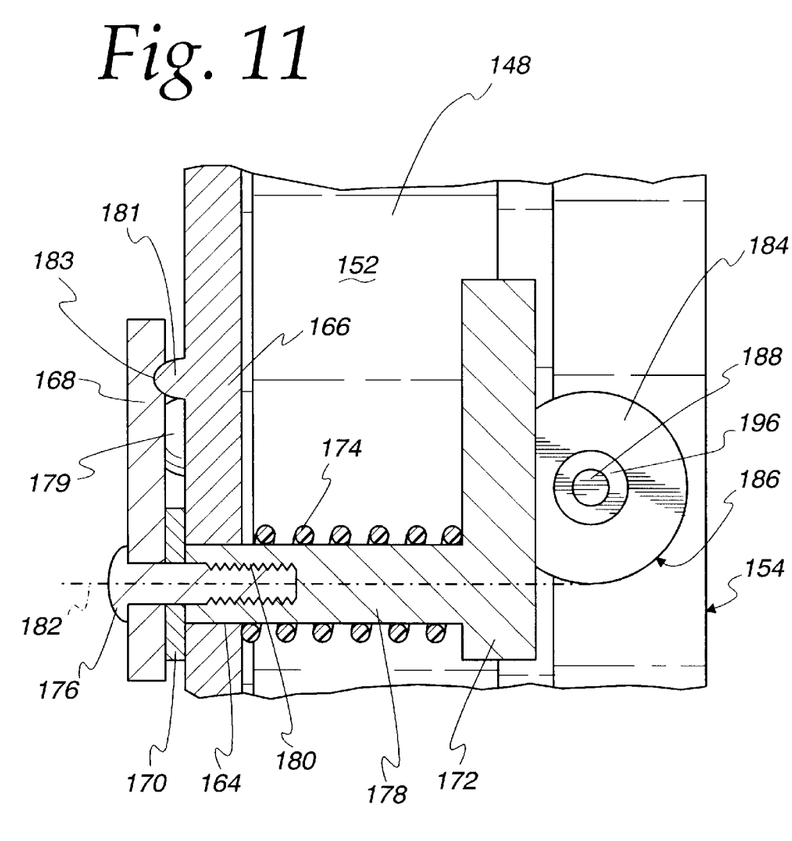
FIG. 11 is an enlarged, partial cross-sectional view of a brake force selection mechanism for use in the fishing reel in FIGS. 6–9, taken about line 11—11 in FIG. 7.

The range of angular motion of the selector switch 150 about the axis 182 can be limited by placing a pair of stops 179 which abut to the switch 150 at the limits of the desired range of angular motion for the selector switch 150. Additionally, motion of the selection switch 150 within the range of angular motion defined by the stops 179 is further restricted by a detent locking mechanism including a plurality of projections 181 (preferably three) and a recess 183 for the projection 181 formed in the external switch 168. Particularly, with one of the projections 181 at least partially disposed in the recess 183, the switch 150 will be fixed in one of a number of predetermined angular positions, for example, corresponding to an "ON" or "OFF" position as is explained in greater detail below. With the application of sufficient force to the external switch 168, the projection 181 will be forced through and out of the recess 183, such that the switch 150 is rotatable until one of the other projections 181 aligns with the recess 183.

With a base edge of the reel cover 156 abutting and secured to the external surface 154 of the frame 138 and the brake weight carrier 148 secured for rotation about the axis 144, the brake weight retractor 172 cooperates with a flange 184 formed integrally with the brake weights 186 to limit the range of radial motion of the brake weights 186 in the following manner. The brake weights 186 are attached to the brake weight mounting 148 to be rotatable with the brake weight mounting 148 about the axis 144 and moveable radially relative to the axis 144. Preferably, the brake weights 186 are mounted on cylindrical brake weight arms 188, in this case four in number, being equally spaced and secured to the brake weight mounting 148 in apertures 189. The brake weights 186 have a bore 190 formed therethrough, and the brake arms 188 are disposed at least partially in the bore 190 so that the brake weights 186 are rotatable with the brake weight mounting 148 and moveable radially along the brake weight arms 188. Outward radial movement of the brake weights 186 is limited by a brake surface 192, which is attached to an interior surface 194 of the reel housing 156.

The outward radial motion of the brake weights 188 is also limited in part by the selector switch 150, and particularly the brake weight retractor 172. The brake weight retractor 172 is positionable to cooperate with the brake weight flange 184 so as to apply a force to the brake weight flange 184 to cause the brake weight 186 to move inward radially, and thereby to prevent or limit the contact force between the brake weight 186, and more particularly a brake weight surface 196 on the radially distal end 198 of the brake weight 186, and the brake surface 192.

Figure 9A:
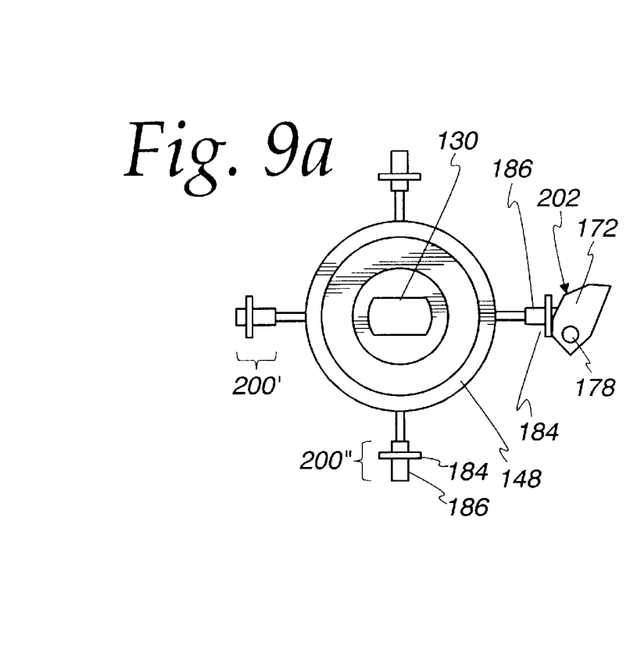
FIGS. 9a–c are enlarged, partial side elevation views showing various arrangements of brake weights achievable using the fishing reel in FIGS. 6–8.
Figure 9B:
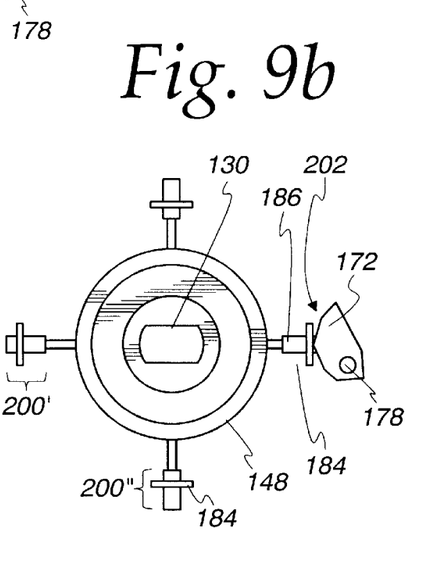
Figure 9C:
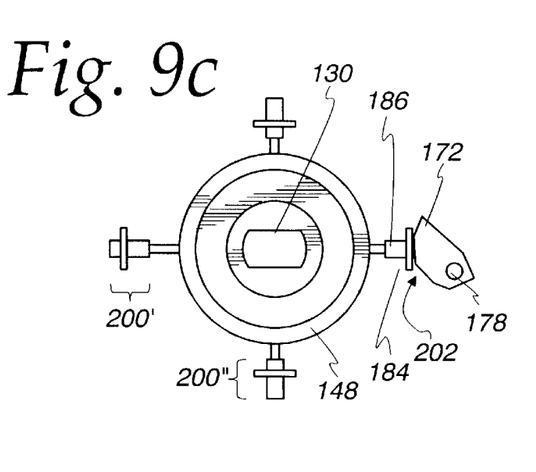

As shown in greater detail in FIGS. 9a–c, the brake weights 188 are disposed in two different orientations along the brake arms 188, a first orientation 200' with the brake weight flanges 184 radially outwardly directed and a second orientation 200" with the brake weight flanges 184 radially inwardly directed. The brake weight retractor 172 is formed with a positioning surface 202 for cooperating with the differently oriented brake weight flanges 184 to selectively force all four, two or none of the brake weights 186 radially inward relative to the axis 144.

With the selector switch 150 in the "ON" position (FIG. 9a), the positioning surface 202 is positioned so that the brake weight flanges 184 in both orientations 200', 200" pass radially inside of the positioning surface 202. With the selector switch 150 in the middle position (FIG. 9b), the positioning surface 202 cooperates with the brake weight flanges 184 in the orientation 200', and forces the corresponding brake weights 186 inward, preventing or limiting the contact force between these brake weights 186 and the brake surface 192. In this position, the positioning surface 202 preferably does not contact any of the brake weight flanges 184 in the orientation 200". With the selector switch 150 in the "OFF" position, all four brake weights 186 are forced inward by contact between the positioning surface 202 and the brake weight flanges 184.

Disposed to limit access to the selector switch 150, and in particular the external switch 168, is a pivoting switch cover 204, which has an external surface 206 which mates with the external surface 208 of the reel cover 156 to provide a substantially uniform external surface. The switch cover 204 pivots about a connector 210, shown in greater detail in FIG. 10, between an open position, wherein the external switch 168 can be manipulated by an angler, and a closed position, wherein the external switch 168 is disposed in a space 211 defined by the external surface 212 of the reel cover wall 166 and an internal surface 213 of the switch cover 204. Preferably, the switch cover 204 is held in place in the closed position by a locking mechanism (not shown).

Figure 10:
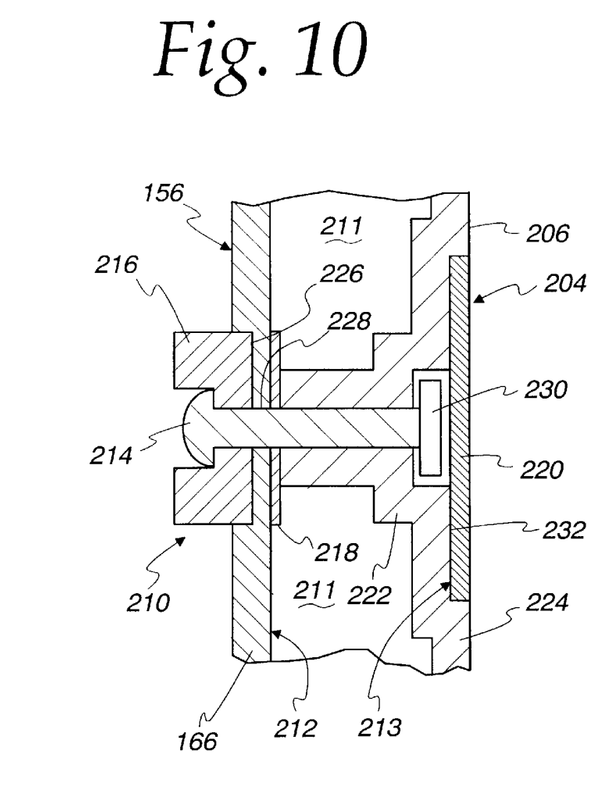
FIG. 10 is an enlarged, partial cross-sectional view of a connector used to secure a pivotable switch cover to a fixed reel cover in the fishing reel in FIGS. 6–9, taken about line 10—10 in FIG. 7.

The connector 210 includes a fastener or rivet 214, an inner spacer 216, and outer washer 218 and a removable, preferably flexible plastic, pivot cover 220. A stepped, cylindrical, hollow shaft 222 is formed from a wall 224 of the switch cover 204. The shaft 222 acts to space the internal surface 213 of the switch cover 204 from the external surface 212 of the reel cover 156, and to accommodate the rivet 214 which secures the switch cover 204 to the reel cover 156. Particularly, the inner spacer 216 is placed into a preferably oval, cylindrical recess 226 made in the wall 166 of the reel cover 156. The rivet 214 is passed through the inner spacer 216 and the wall 166 through an opening 228 in the wall 166 of the reel cover 156. The rivet 214 is further disposed through the outer washer 218 and the hollow shaft 222. With the connector 210 so assembled, the distal end 230 of the rivet is deformed to secure the switch cover 204 to the reel cover 156. The pivot cover 220 is then placed over the distal end 230 of the rivet 214 in a stepped recess 232 formed in the external surface 206 of the switch cover 204.

In operation, an angler first unlocks the switch cover locking mechanism (not shown) and applies a force to the switch cover 204 so as to pivot the switch cover 204 in a clockwise motion indicated by an arrow 234 (FIG. 7) about the connector 210. The clockwise pivoting of the switch cover 204 about the connector 210 exposes the selection switch 150, in particular the external switch 168, to the angler. The angler may then move the selection switch 150 either clockwise to increase the brake force generated by the brake system 40, or counter-clockwise to decrease the brake force generated by the brake system 40.

Particularly, the movement of the selection switch 150 in a counter-clockwise direction from, for example, the middle position to the "OFF" position causes the positioning surface 202 to contact the brake weight flanges 184 of all four of the brake weights 186, thereby causing all of the brake weights 186 to be shifted radially inwardly relative to the axis 144, thereby limiting the contact force between its brake weights 186 and brake surface 192 or preventing the brake weights 186 from contacting the brake surface 192. Contrariwise, if the selection switch 150 is moved from the middle position to the "ON" position, the positioning surface 202 is moved out of the path of the brake weights 186. With the positioning surface 202 moved out of the path of the brake weights 186, all four brake weights 186 are moveable centrifugally radially relative to the axis 144 such that the brake weights 186 and associated brake weight surfaces 196 may contact the brake surface 192, thereby slowing the motion of the shaft 130 and spool 146 about the axis 144.

When the proper brake force level has been selected by pivoting the switch 150 to correspond with the desired brake force level, the switch cover 204 is pivoted in a counter-clockwise motion, and secured to the reel cover 156 using the switch cover locking mechanism. The use of the switch cover 204 provides an additional barrier between the brake system 40 and the external environment, and thereby further prevents the infiltration of contaminants into the brake system 40.

Thus, the present invention may eliminate the need to disassemble the reel cover and operating mechanism of a bait casting reel when varying the brake force provided by a centrifugal brake system. Moreover, the remotely operable centrifugal brake system may reduce or eliminate the tedious, time-consuming process of varying the brake weights manually, often through apertures in the reel cover too small for most anglers' fingers. Additionally, the remotely operable centrifugal brake system may reduce or eliminate access paths for dirt and water to infiltrate into the operating mechanism of the reel. Further, the brake system provides a user-friendly interface which makes the process of varying the brake weights more intuitive and easily understood by the novice and experience angler alike.

Still other aspects, objects, and advantages of the present invention can be obtained from a study of the specification, the drawings, and the appended claims.

I claim:

1. A fishing reel comprising:

a frame; and an operating mechanism on the frame, the operating mechanism comprising a spool assembly mounted to the frame for rotation around a first axis to direct fishing line onto the spool assembly, the operating mechanism further comprising a brake assembly, the brake assembly comprising a brake surface on the frame, a brake weight with a brake weight surface, and first means for mounting the brake weight to the spool assembly for movement between a) a first position wherein the brake weight surface on the brake weight is urged against the brake surface on the frame to generate a first braking force as an incident of the spool assembly rotating at a first predetermined velocity and b) a second position wherein the brake weight surface on the brake weight is not urged against the brake surface on the frame, the brake assembly further comprising a selector that is operable remotely from the brake weight and placable selectively in a first and a second state for i) preventing the brake weight from moving from the second position into the first position as the spool assembly is rotated at the first predetermined velocity with the selector in the first state and ii) allowing the brake weight to move from the second position into the first position as the spool assembly is rotated at the first predetermined velocity with the selector in the second state.

2. The fishing reel according to claim 1, wherein:

the brake weight has a protrusion, and the selector comprises means for i) abutting to the protrusion to thereby prevent the brake weight from moving from the second position into the first position as the spool assembly is rotated at the first predetermined velocity with the selector in the first state and ii) allowing the brake weight to move from the second position into the first position as the spool assembly is rotated at the first predetermined velocity with the selector in the second state.

3. The fishing reel according to claim 2, wherein:

the first means for mounting the brake weight to the spool assembly comprises means for mounting the brake weight for rotation with the spool assembly and for movement radially relative to the first axis, and the means for restricting the movement of the protrusion relative to the spool assembly includes a positioning surface that is selectively repositionable relative to the frame and the brake weight between first and second operational states, a first part of said positioning surface in the first operation state is spaced a first distance from the first axis to restrict the movement of the protrusion radially away from the first axis and prevent the brake weight from moving from the second position to the first position as the spool assembly is rotated at the first predetermined velocity with the selector in the first state, and a second part of said positioning surface in the second operational state is spaced a distance different than the first distance from the first axis to allow the brake weight to move from the second position into the first position as the spool assembly is rotated at the first predetermined velocity with the selector in the second state.

4. The fishing reel according to claim 3, wherein:

the selector includes an annular race, the race has a radially outer wall which defines the positioning surface, the positioning surface having a curved shape continuously between the first and second parts of the positioning surface.

5. The fishing reel according to claim 4, wherein:

the race has a radially inner wall, and the protrusion is disposed between the radially inner wall and the radially outer wall.

6. The fishing reel according to claim 5, wherein:

a first portion of the brake assembly secured to and rotatable with the spool assembly is spaced remotely from the brake weight and has a first symbol marked thereon, a first portion of the selector is spaced remotely from the brake weight and has a second symbol marked thereon, and the second symbol is moveable relative to the first symbol as an incident of the selector being moved between the first and second states for the selector.

7. The fishing reel according to claim 3, wherein:

the brake assembly includes means for selectively releasably maintaining the selector in predetermined positions with the selector in each of the first and second states.

8. The fishing reel according to claim 7, wherein:

the selector rotates around the first axis between a first angular position corresponding to the first state and a second angular position corresponding to the second state, and the means for selectively releasably mounting the selector includes a detent locking mechanism, a first portion of which is carried on the selector and a second portion of which is carried on the spool assembly.

9. The fishing reel according to claim 7, wherein:

the selector rotates about a second axis between a first angular position corresponding to the first state and a second angular position corresponding to the second state, the second axis is spaced from the first axis, and the means for selectively releasably mounting the selector includes a detent locking mechanism, a first portion of which is carried on the selector and a second portion of which is carried on the frame.

10. The fishing reel according to claim 3, wherein:

the first means for mounting the brake weight to the spool assembly includes a brake arm extending radially from the first axis and secured to the spool assembly for rotation with the spool assembly, and one of the brake arm and the brake weight has a bore formed therethrough and the other of the brake arm and the brake weight is disposed at least partially in the bore in the one of the brake arm and the brake weight.

11. The fishing reel according to claim 10, wherein:

the spool assembly includes a shaft and a line-carrying spool attached to the shaft for rotation with the shaft around the first axis, the first means for mounting the brake weight to the spool assembly includes a brake weight carrier secured to the shaft to be rotatable with the shaft around the first axis, and the brake arm is secured to the brake weight carrier.

12. The fishing reel according to claim 11, wherein:

the brake weight has the bore formed therethrough and the brake arm is disposed at least partially in the bore in the brake weight.

13. The fishing reel according to claim 11, wherein:

the selector rotates around the first axis between a first angular position corresponding to the first state and a second angular position corresponding to the second state, and the brake assembly includes means for selectively limiting movement of the selector around the first axis to maintain the selector in either the first or second state including a detent locking mechanism, a first portion of which is carried on the selector and a second portion of which is carried on the brake weight carrier.

14. The fishing reel of claim 3 wherein said positioning surface does not move axially relative to said first axis in repositioning said first and second parts of said positioning surface relative to the frame and brake weight.

15. The fishing reel according to claim 2, wherein:

the frame defines a receptacle, the brake weight and a first portion of the selector are disposed within the receptacle, and a second portion of the selector is disposed outside the receptacle.

16. The fishing reel according to claim 15, wherein:

a first portion of the brake assembly secured to the spool assembly and rotatable about the first axis is spaced outside the receptacle and has a first symbol marked thereon, the second portion of the selector is selectively rotatable around the first axis relative to the first portion of the brake assembly and has a second symbol marked thereon, and the second symbol is moveable relative to the first symbol as an incident of the selector being moved between the first and second states.

17. The fishing reel according to claim 15, wherein:

the frame is marked with a first symbol, the second portion of the selector is spaced remotely from the first axis and marked with a second symbol, the second symbol is moveable relative to the first symbol as an incident of the selector being moved between the first and second states.

18. The fishing reel according to claim 2, wherein:

the first means for mounting the brake weight to the spool assembly comprises means for mounting the brake weight for rotation with the spool assembly and for movement radially relative to the first axis, and the selector includes a race defined by the first portion of the selector and with a positioning surface that is selectively repositionable relative to the frame and the brake weights between first and second operational states, a first part of said positioning surface in the first operational state is spaced a first distance from the first axis to restrict the movement of the protrusion radially away from the first axis and prevent the brake weight from moving from the second position to the first position as the spool assembly is rotated at the first predetermined velocity with the selector in the first state, and a second part of said positioning surface in the second operation state is spaced a distance different than the first distance from the first axis to allow the brake weight to move from the second position into the first position as the spool assembly is rotated at the first predetermined velocity with the selector in the second state.

19. The fishing reel according to claim 1, further including:

a plurality of brake weights, each one of the plurality of brake weights having a brake weight surface, a plurality of means for mounting the plurality of brake weights to the spool assembly for movement of the each one of the plurality of brake weights between a) said first position wherein the brake weight surface on the each one of the plurality of brake weights is urged against the brake surface on the frame to generate a second braking force as an incident of the spool assembly rotating at a first predetermined velocity and b) said second position wherein the brake weight surface on one or more of the each one of the plurality of brake weights is not urged against the brake surface on the frame, said selector operable remotely from the plurality of brake weights and placable selectively in said first and second states for i) preventing one or more of the plurality of brake weights from moving from the second position into the first position as the spool assembly is rotated at the first predetermined velocity with the selector in the first state and ii) allowing one or more of the plurality of brake weights to move from the second position into the first position as the spool assembly is rotated at the first predetermined velocity with the selector in the second state.

* * * * *